Dec. 23, 1969          T. D. NOGLE          3,485,540
JOURNAL MOUNTING FOR ROTATABLE SHAFT
Filed June 20, 1968
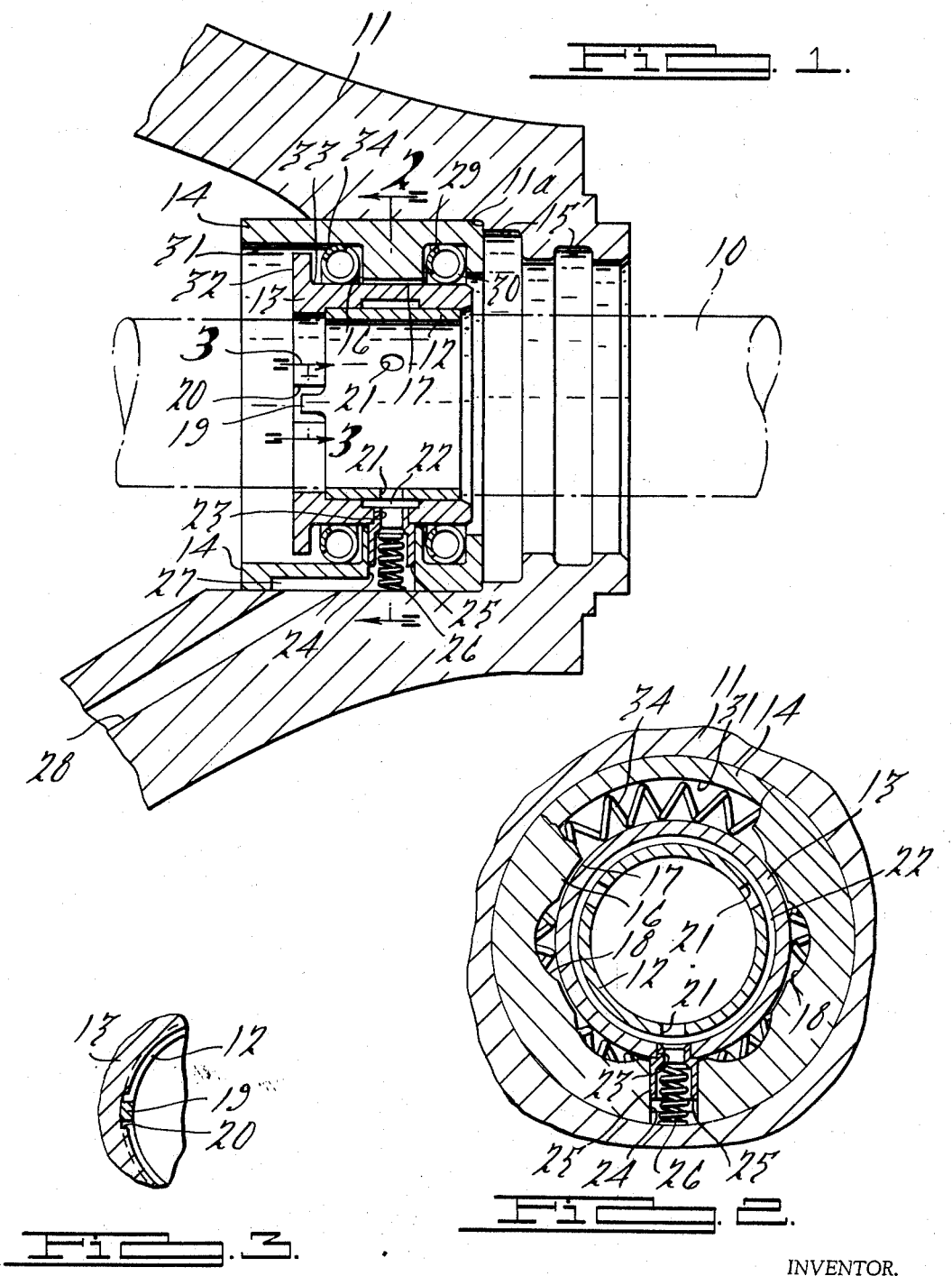
INVENTOR.
Thomas D. Nogle.
BY
Harness Talbutt & Baldwin
ATTORNEYS.

United States Patent Office 3,485,540
Patented Dec. 23, 1969

3,485,540
JOURNAL MOUNTING FOR ROTATABLE SHAFT
Thomas D. Nogle, Madison Heights, Mich., assignor to Chrysler Corporation, Highland Park, Mich., a corporation of Delaware
Filed June 20, 1968, Ser. No. 738,569
Int. Cl. F16c 7/04, 17/16
U.S. Cl. 308—9                                                                   8 Claims

ABSTRACT OF THE DISCLOSURE

A self-aligning bearing support for the journal of a high speed rotatable shaft is resiliently supported by annular steel spring means having a comparatively low spring rate radially and portions spaced circumferentially for the unrestricted passage of lubricating fluid therebetween. The spring is compressed radially between the bearing support and an outer housing, which are closely spaced radially at a plurality of circumferentially spaced locations to effect an annularly arranged movement limiting clearance in communication with and interrupted by a plurality of circumferentially spaced regions of large radial clearance which also communicate with the spacing between the springs and with a drain to render oil film squeeze damping nominal at the movement limiting clearance. The housing and bearing are interlocked against relative axial and rotational movement by a portion of the lubricating oil duct system.

BACKGROUND OF THE INVENTION

This invention relates to a mounting suitable for a high speed rotatable shaft, as for example the compressor shaft for an automobile gas turbine engine subject to high temperature operating conditions and ordinarily susceptible to the transmission of alternating radial forces to and from the shaft resulting from shaft imbalance during rotation or road shock.

It has been common heretofore to provide resiliently mounted bearings for such shafts, employing rubber-like O-rings or in some cases metal springs. The O-rings are economical and permit easy bushing replacement but are otherwise objectionable because very low spring rates cannot be obtained and the rubber-like material has high internal damping. Both factors contribute to the undesirable transmission of radial forces to and from the shaft and result in undue wearing of the rotor assembly and the transmission of rotor frequency noise. Furthermore, the O-ring material cannot withstand high temperatures and its imperviousness frequently causes an annulus of oil to be trapped between adjacent O-rings, or an O-ring and a seal, with consequent oil film squeeze damping which contributes to the transmission of radial forces.

The metal springs employed heretofore have had low internal damping and have enabled wide temperatures and spring rate ranges, but have resulted in oil film damping in consequence of lubricating oil being trapped between the inner and outer bearing cages, and frictional damping resulting from movement of the seal rings in their grooves. Also such bearing mountings have been subject to the assembly problem of maintaining concentricity of the journal and are generally difficult to remove and replace.

SUMMARY OF THE INVENTION

An object of the present invention has been to avoid the above difficulties and specifically to provide an improved resilient shaft mounting as aforesaid suitable for high speed and high temperature applications and characterized by minimum radial spring rate and damping consistent with support requirements, which thereby effects a resonance frequency far below the normal operating speed, yet which limits maximum shaft deflection during occasional unusually high radial loading.

Another object is to provide such a mounting comprising a bearing support which is independent of any thrust face on the shaft and which in consequence is self-aligning with the shaft or other journal means for the shaft, so as to minimize the transmission of radial forces and rotor frequency noise resulting from eccentricity or misalignment.

Another object is to provide such a mounting wherein the oil feed system maintains the bearing support in axial and circumferential position with respect to the shaft without interfering with the aforesaid self-aligning character of the bearing support.

Other objects are to provide an improved, resiliently yieldable, self-aligning bearing support which can be readily assembled and replaced and which comprises annular steel spring means having circumferential spacing for the free passage of lubricating oil to minimize damping, and to provide such a spring which yieldably maintains the bearing support in coaxial alignment with the shaft and allows limited cocking or radial adjustability of the bearing support to effect said alignment.

Other objects of this invention will appear in the following description and appended claims, reference being had to the accompanying drawings forming a part of this specification wherein like reference characters designate corresponding parts in the several views.

FIGURE 1 is a longitudinal sectional view through a rotatable shaft mounted in accordance with the present invention.

FIGURE 2 is a transverse sectional view taken in the direction of the arrows substantially along the line 2—2 of FIGURE 1.

FIGURE 3 is a fragmentary sectional view taken in the direction of the arrows substantially along the line 3—3 of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Referring to the drawings, a shaft 10 which may comprise the high speed rotatable shaft of an automobile gas turbine compressor, is journalled within a housing 11 by bearing means including an annular bushing 12 pressed snugly into an annular support 13. The latter is maintained coaxially within an annular non-rotatable sleeve 14 of housing 11, the sleeve 14 being pressed tightly into housing 11 against a shoulder 11a. Annular grooves 15 are shown within the housing 11 for commercial shaft seals not shown.

A plurality of circumferentially spaced projections 16 integral with the sleeve 14 extend radially toward the outer periphery of the support 13 and are spaced radially therefrom approximately .004 to .005 inch or less to effect an annularly arranged movement limiting clearance 17. Between the projections 16, the body of the sleeve 14 is relieved or scalloped at 18 to provide large radial clearances between the sleeves 13 and 14, FIG. 2.

The bushing 12 is retained against relative rotation by means of a radially offset tab 19 confined within a recess 20 in the sleeve 13, FIG. 3. A plurality of circumferentially spaced oil ports 21 extending radially through the bushing 12 are fed by means of an annular recess 22 confronting the bushing 12 within the sleeve 13. A pair of radially aligned holes 23 and 24 within the sleeves 13 and 14 respectively are maintained in alignment by means of a tubular latch 25 interfitting within both holes 23 and 24. The hole 23 freely receives the latch 25 so as not to interfere with the adjustability of support 13 as described below and has a smaller diameter than hole 24 to provide a slight radial offset or annular seat for a mating annular offset of the tubular latch 25, whereby the latter is located radially. A retaining spring 26 coaxially within latch 25 seats against the latter's offset portion and the housing 11 and urges the latch 25 radially inwardly to its seated position, thereby to interlock the housing sleeve 14 with the bearing sleeve 13 to limit both rotational and axial relative movement therebetween. The holes 23 and 24 are also in line with one hole 21 in bushing 12 to enable insertion of a tool to push latch 25 against spring 26 and thereby permit easy and simple disassembly. The latch 25 also provides an oil supply duct connecting the annular recess 22 with a recess 27 in sleeve 14, which in turn is connected with a lubrication supply duct 28.

Axially offset from the projections 16 at one side is an annular spring retaining channel 29 within housing sleeve 14 for a circumferentially extending spirally wound solenoidal steel spring 30. On the other axial side of the projections 16 is an annular recess 31 within sleeve 14, which cooperates with an annular flange 32 of the bearing sleeve 13 to provide an annular spring retaining recess 33 containing a circumferentially extending solenoidal spring 34, similarly to recess 29 and spring 30.

The springs 30 and 34 are each under compression radially between the sleeves 13 and 14 to resiliently maintain the sleeve 13 in concentric alignment with respect to sleeve 14 and to allow limited radial movement or cocking of sleeve 13 to the limit permitted by the slight clearance 17. Also relative to the large force impulses which are ordinarily transmitted by a shaft 10 employed as aforesaid, the springs 30 and 34 have comparatively low spring rates radially totaling about 3,000 pounds per inch. Although the radial force impulses transmitted from the high speed rotating shaft 10 might be very large, the duration of each impulse during ordinary operation is very small and the amplitude of the associated radial movement of shaft 10 resulting from rotational imbalance is substantially less than the clearance 17 and ordinarily in the neighborhood of .001 inch. The resulting radial force ordinarily transmitted by the two springs 30 and 34 in parallel is only about 3 lbs. A radial movement amplitude of .003 inch would be exceptional.

The individual coils of the springs 30 and 34 are spaced circumferentially, as indicated in FIGURE 2, to permit the free flow of lubricating fluid therebetween to the left side of the mounting in FIGURE 1 which opens to a conventional drain. However the coils of springs 30 and 34 are spaced sufficiently closely to balance out minor deviations in their dimensions and to maintain the sleeves 13 and 14 yieldingly in the desired coaxial alignment prior to assembly with shaft 10.

The scalloped portions 18 not only provide unrestricted communication between the right and left recesses 29 and 33, but also minimize the confronting surface area of each projection 16 and the sleeve 13 at the clearance 17, thereby to minimize oil film squeeze damping at the clearance 17. This latter area will be as small as is feasible consistent with the support requirements, so that in the event of occasional large radial forces directed to or from the shaft 10 as a result of momentary imbalances or road shocks, the maximum movement of the bearing support will be limited without overloading and damaging the contact area between the projections 16 and support 13. On the other hand, the recesses 18, 29 and 33 in communication with the clearance 17 render damping in consequence of oil film squeeze at the clearance 17 nominal and unobjectionable. The springs 30 and 34 rather than oil damping are the primary means for transmitting radial forces. The radial spring rate of the steel springs 30 and 34 may be suitably predetermined in accordance with the support requirements without significant adverse effects from high temperature operating conditions, whereby resonance is avoided and the transmission of rotor noise and radial forces resulting from rotor imbalance is minimized.

I claim:
1. In the combination of means operable under high temperature conditions for reducing the transmission of radial forces from a rotatable shaft during high speed rotation,
 (A) bearing means having
  (1) a bearing portion for journaling said shaft and
  (2) annularly arranged supporting means for said bearing portion,
 (B) an outer annular bearing housing around said supporting means,
 (C) said housing and supporting means having
  (1) cooperating portions closely spaced radially at a plurality of circumferentially spaced locations to effect a predetermined small annular movement limiting radial clearance between said cooperating portions to limit the maximum radial deflection of said supporting means with respect to said housing at said locations in consequence of unusual large radial forces transmitted to said bearing means from said shaft, and
  (2) a comparatively large radial spacing therebetween in unrestricted communication with the clearance at said locations for reducing oil film damping thereat comprising a large radial space separating said housing and supporting means between each adjacent pair of said locations,
 (D) spring means arranged annularly around said supporting means in said radial spacing,
 (E) said spring means having
  (1) a comparatively small spring rate radially and
  (2) being under compression between said housing and supporting means to urge the latter yieldingly to a predetermined centered position.

2. In the combination according to claim 1, means for supplying pressurized lubricating fluid to said bearing means, and drain means for conveying said lubricating fluid from said bearing means, said drain means being in communication with said radial spacing.

3. In the combination according to claim 2, said spring means comprising a plurality of radial convolutions offset axially from said locations and spaced circumferentially for the free flow of lubricating fluid therebetween in said radial spacing.

4. In the combination according to claim 3, said means for supplying lubricating fluid comprising radially aligned lubricating ports in said housing and bearing means, and means for holding said bearing means in predetermined axial and circumferential relationship with respect to said housing comprising tubular latch means interfitting within said aligned ports for conducting lubricating fluid therethrough.

5. In the combination according to claim 4, shoulder means on said bearing means abutting said latch means to limit radial inward movement thereof, and resilient means yieldingly urging said latch means radially inwardly, said latch means fitting loosely within said supporting means to enable limited radial and cocking movement of the latter with respect to said latch means and housing.

6. In the combination according to claim 1, said cooperating portions of said housing and supporting means comprising a plurality of circumferentially spaced radial projections of said housing extending radially toward the outer periphery of said supporting means, said housing extending axially from said radial projections to provide spring retaining means spaced radially from said outer periphery, said spring means extending annularly around said outer periphery in the radial space between the latter and said spring retaining means and comprising a plurality of radial convolutions spaced circumferentially for the free flow of lubricating fluid therebetween.

7. In the combination according to claim 6, said bearing portion comprising a sleeve bushing fixed with respect to said supporting means and secured coaxially therein, means for supplying lubricating fluid to said bushing comprising radially aligned lubricating passages in said housing, supporting means, and bushing, and means for holding said supporting means and housing in predetermined axial and circumferential relationship with respect to each other comprising tubular latch means interfitting within the aligned passages of said housing and supporting means for conducting lubricating fluid therethrough to the aligned passage of said bushing.

8. In the combination according to claim 7, shoulder means on said supporting means abutting said latch means to limit radial inward movement thereof, and resilient means yieldingly urging said latch means radially inwardly, said latch means fitting loosely within said supporting means to enable limited radial and cocking movement of the latter with respect to said latch means and housing.

References Cited
UNITED STATES PATENTS
2,188,862   1/1940   Hoger _____ 308—26

MARTIN P. SCHWADRON, Primary Examiner

F. SOSKO, Assistant Examiner